US006243683B1

United States Patent
Peters

(10) Patent No.: US 6,243,683 B1
(45) Date of Patent: Jun. 5, 2001

(54) VIDEO CONTROL OF SPEECH RECOGNITION

(75) Inventor: Geoffrey W. Peters, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/223,074

(22) Filed: Dec. 29, 1998

(51) Int. Cl.[7] .............................. G10L 11/00; G10L 15/02; G10L 15/24; G09C 1/00

(52) U.S. Cl. .................... 704/273; 704/275; 704/274; 704/246; 704/270; 434/4

(58) Field of Search .................................. 704/270, 231, 704/260, 275; 381/111–117; 379/69, 70, 79, 80, 902; 434/4

(56) References Cited

U.S. PATENT DOCUMENTS

| | | | |
|---|---|---|---|
| 4,961,177 | * 10/1990 | Uehara ................................. | 704/272 |
| 5,729,694 | * 3/1998 | Holzrichter et al. ................. | 704/270 |
| 5,890,116 | * 3/1999 | Itoh et al. ............................ | 704/260 |
| 6,023,675 | * 2/2000 | Bennett et al. ...................... | 704/235 |

OTHER PUBLICATIONS

"Tracking Multiple Talkers Using Microphone–Array Measurements," D. Sturim, M. Brandstein, H. Silverman; IEEE International Conference on Acoustics, Speech & Signal Processing, Apr. 1997.*

Wang et al (A Hybrid Real–Time Face Tracking System, IEEE International Conference on Acoustics, Speech & Signal Processing, May 1998).*

Wang & Chu ("Voice Source Localization for Automatic Camera Pointing System in Videoconferencing," IEEE International Conference on Acoustics, Speech & Signal Processing, May 1997).*

* cited by examiner

Primary Examiner—Richemond Dorvil
Assistant Examiner—Daniel A. Nolan
(74) Attorney, Agent, or Firm—Schwegman, Lundberg, Woessner & Kluth P.A.

(57) ABSTRACT

Method and apparatus for using video input to control speech recognition systems is disclosed. In one embodiment, gestures of a user of a speech recognition system are detected from a video input, and are used to turn a speech recognition unit on and off. In another embodiment, the position of a user is detected from a video input, and the position information supplied to a microphone array point of source filter to aid the filter in selecting the voice of a user that is moving about in the field of the camera supplying the video input.

21 Claims, 7 Drawing Sheets

VIDEO CONTROL OF SPEECH RECOGNITION

TECHNICAL FIELD OF THE INVENTION

The present invention relates to the field of computer technology. More particularly, the present invention relates to the use of computer technology for speech recognition.

BACKGROUND OF THE INVENTION

Speech recognition has the potential to provide a significant leap in the application of computing technology. One of the barriers in the adoption of speech recognition is its inability to distinguish the relevant spoken commands intended for the computer from the otherwise irrelevant speech common throughout the day, such as passing conversations, muttering, and background conversation. As a result, most speech recognition systems require the user to continuously indicate to the computer when to start or stop listening, so that the system does not interpret speech intended for other listeners.

Humans, however, are quite adept at determining what speech is directed at them, and use a number of techniques to guide them in this, such as:

1. Specific keywords (such as our names);
2. Body contact (such as a tap on the shoulder);
3. Proximity of the noise (relative volume); and
4. Visual clues (such as establishing eye contact, or pointing while one is moving their mouth).

In order to provide speech recognition systems with a human-like level of functionality, speech user interfaces have thus far focused on the first two techniques mentioned above. For instance, analogous to item 1 above, many speech recognition engines or units provide the ability to specify an "attention phrase" to wake up the computer and a "sleep" phrase to force an end to speech recognition. Most interface paradigms also provide a "toggle to talk" button, similar to a tap on the shoulder. These approaches alone, however, have limitations. Attention words are often missed, taking considerable time to eventually turn on or off speech recognition. Toggle to talk buttons require user proximity—undermining speech's inherent advantage of operating without having to be in physical contact with the speech recognition system.

Another problem with speech recognition systems is the inability of a speech recognition system to hone in on a specific audio source location. Recent microphone array research has, however, yielded the ability to hone in on a specific audio source location, thus providing the ability to filter extraneous, irrelevant sounds from the input audio stream. For example, using two microphones, one on each side of a speech recognition system (such as on the left and right side of the monitor of a PC-based system), background noise can be eliminated by using the microphone array to audially narrow into the words emanating from the user's mouth. The speech recognition algorithm can thus obtain a much cleaner audio source to use, increasing both its accuracy and its robustness in harsh (i.e., real world) audio environments. A problem with the microphone arrays, however, is that the user rarely sits still making it difficult to determine the source point to hone in on. This is especially so when speech recognition is performed in non-traditional PC uses (such as in a living room to control a television). Worse yet, if the speech recognition is performed via a hand held pad, the microphone itself is also moving.

As described below, the present invention provides a variety of embodiments that address the limitations of speech recognition systems noted above.

SUMMARY OF THE INVENTION

In one embodiment, the present invention provides a method and apparatus for controlling the operation of a speech recognition unit using a video image to detect gestures made by a user. In another embodiment, the invention provides a method and apparatus for filtering an audio input signal in a speech recognition system using a microphone array to isolate the source of the user's voice, where the location of the user is determined using a video image. In another embodiment, the above described embodiments are combined.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
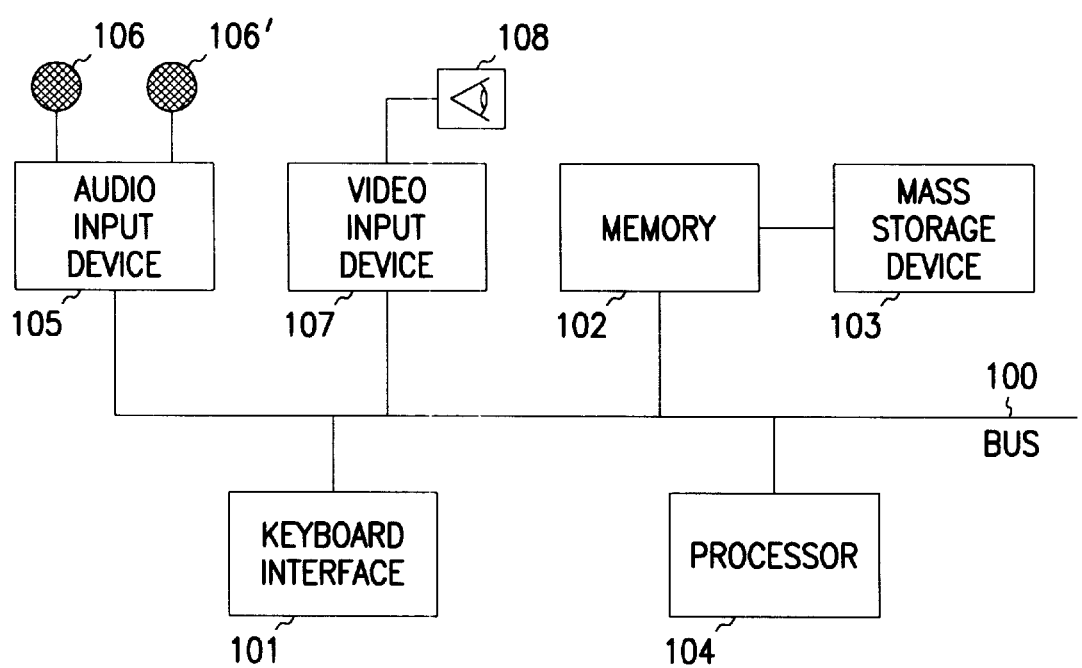
FIG. 1 illustrates in block diagram form an example embodiment of a computer system adapted for speech recognition according the present invention.

Referring now to FIG. 1, there is illustrated in block diagram form a computer system of one embodiment of the present invention. The computer system comprises bus 100, keyboard interface 101, external memory 102, mass storage device 103 and processor 104. Bus 100 can be a single bus or a combination of multiple buses, and provides communication links between components in the computer system. Keyboard controller 101 can be a dedicated device or can reside in another device such as a bus controller or other controller. Keyboard controller 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information from mass storage device 103 and processor 104 for use by processor 104. Mass storage device 103 can be a hard disk drive, a floppy disk drive, a CD-ROM device, or a flash memory device. Mass storage device 104 provides information to external memory 102. Processor 104 can be a microprocessor and is capable of decoding and executing a computer program such as an application program or operating system. An audio input device 105 is also provided, and includes a microphone 106, and optionally a second microphone 106' to receive sound in the environment of the system and convert it to a digital form that can be processed by the system, and in particular processor 104. In addition, the computer system includes a video input device 107, and includes a video camera 108 that is positioned to view a visual field proximate the computer system. Video input device outputs a digital video signal that can be processed by processor 104, as described below.

Figure 2:
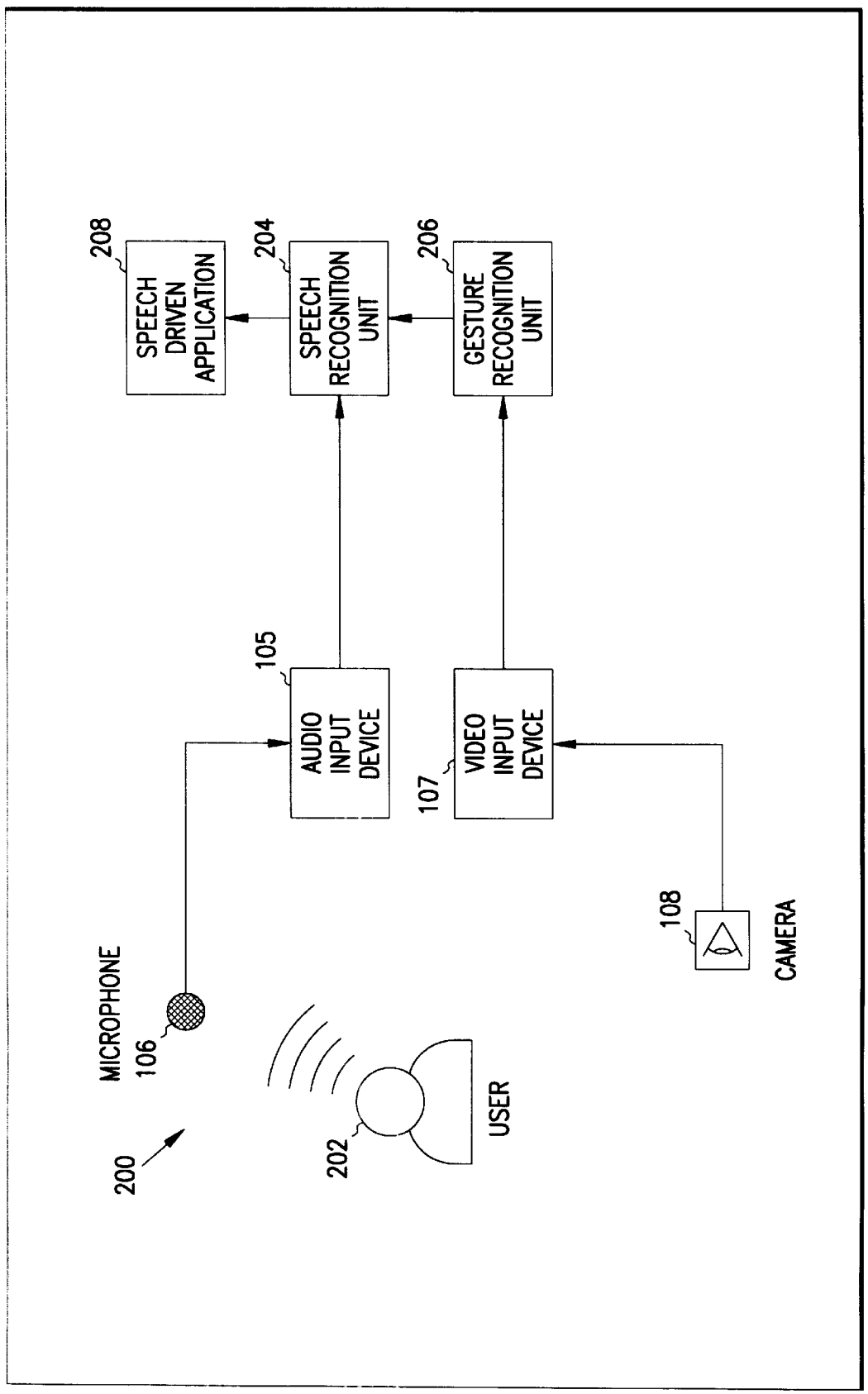
FIGS. 2 and 3 illustrate a first example embodiment of the invention wherein video input is used to aid in the control of a speech recognition unit.

Referring now to FIG. 2, there is illustrated a block diagram of an example embodiment 200 of a speech recognition system according to one embodiment of the invention. As illustrated in FIG. 2, a user 202 is positioned within the field of view of camera 108, and within the range of microphone 106. Audio input device 105 and video input device 107, in turn, output digital information to a speech recognition unit 204 and a gesture recognition unit 206. Gesture recognition unit 206 provides input to speech recognition unit 204, which in turn provides input to a speech driven application 208.

Figure 3:
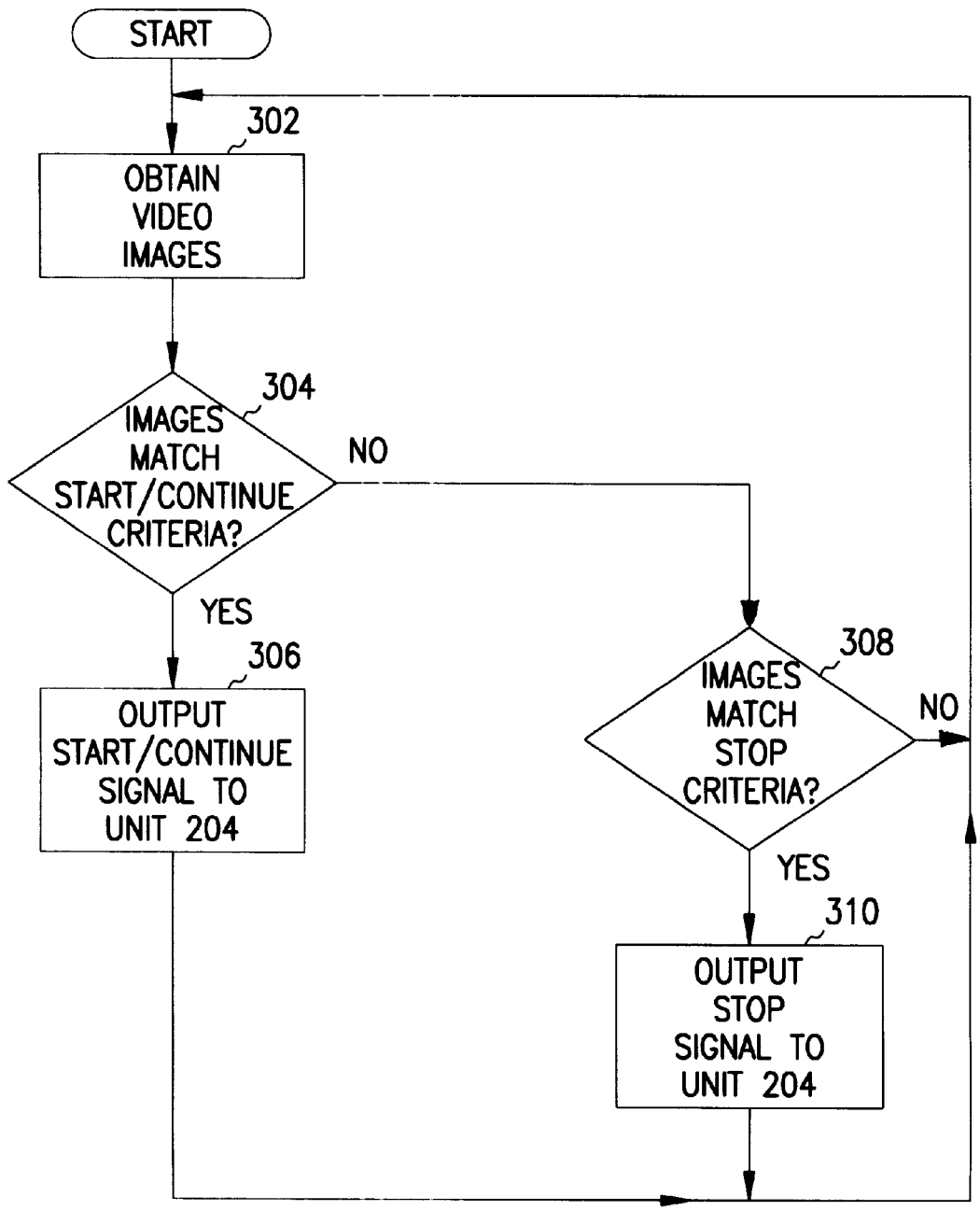

Referring now to FIG. 3, there is illustrated a flow diagram of the operation of gesture recognition unit 206. Unit 206 receives one or more frames of a video image of a user 202, obtained by cameral 108 (302). This image(s) is analyzed to determine if the user has made one or more gestures in a way that is intended to signify to the system that speech recognition should begin, or continue (304). As used herein, the term "gesture" shall mean any non-verbal movement, position or posture of a user, or the like. For example, unit 206 may be programmed or configured to recognize when a user 202 is looking directly at the camera 108, and output a start/continue signal to the speech recognition unit 204 when this is true. This determination could be achieved, for example, using a face tracking algorithm to identify the user of interest in the field, and to detect when the user is looking at the camera. Suitable face tracking algorithms may provide for matching a user's face with a template of the user's face previously determined and stored, or detecting the outline of a user's head or features of the head and face by comparison to predetermined criteria or generic templates of the features of faces and heads. Detection of when a user is looking at the camera can also be accomplished, in one example embodiment, using a template matching procedure. This procedure can be used to determine when the user's eyes are directed straight at the camera 108, or for example, when the user's head is facing straight at the camera. Alternatively, unit 206 can detect one or more specific body movements, such as a waving of the hand or the user pointing at the camera, to signify that speech recognition should start. In the case of this example embodiment, a full-body gesture recognition procedure is employed, and may analyze multiple video images for this purpose. Alternatively, two or more gestures may be required to activate the speech recognition system. For example, a user may be required to both point and look directly at the camera 108 in order to activate speech recognition.

Continuing to refer to FIG. 3, it is seen that if a gesture or sequence of gestures are detected to mean that speech recognition should start or continue, a start and/or continue signal is output (306) to the speech recognition unit 204. Speech recognition unit 204 in turn is activated or continues to be activated. Similarly, if a gesture or combination of gestures are detected indicating that speech recognition should be stopped (308), unit 206 outputs a stop recognition signal (310) to unit 204, which in turn deactivates speech recognition. It should be readily recognized that, in the case that speech recognition depends on the continuing presence of a certain gesture, such as looking directly into the camera 108, the detection procedure would not require a separate detection of a stop gesture, and rather would only require ongoing recognition of the gesture that starts and continues speech recognition. Once this gesture ceased, unit 206 would cease from producing the start/continue signal, and the speech recognition unit 204 would stop recognition until such time as the start/continue signal was reactivated. Alternatively, embodiment 200 may also be adapted to recognize in addition the position of an instrument held by a user.

Figure 4:
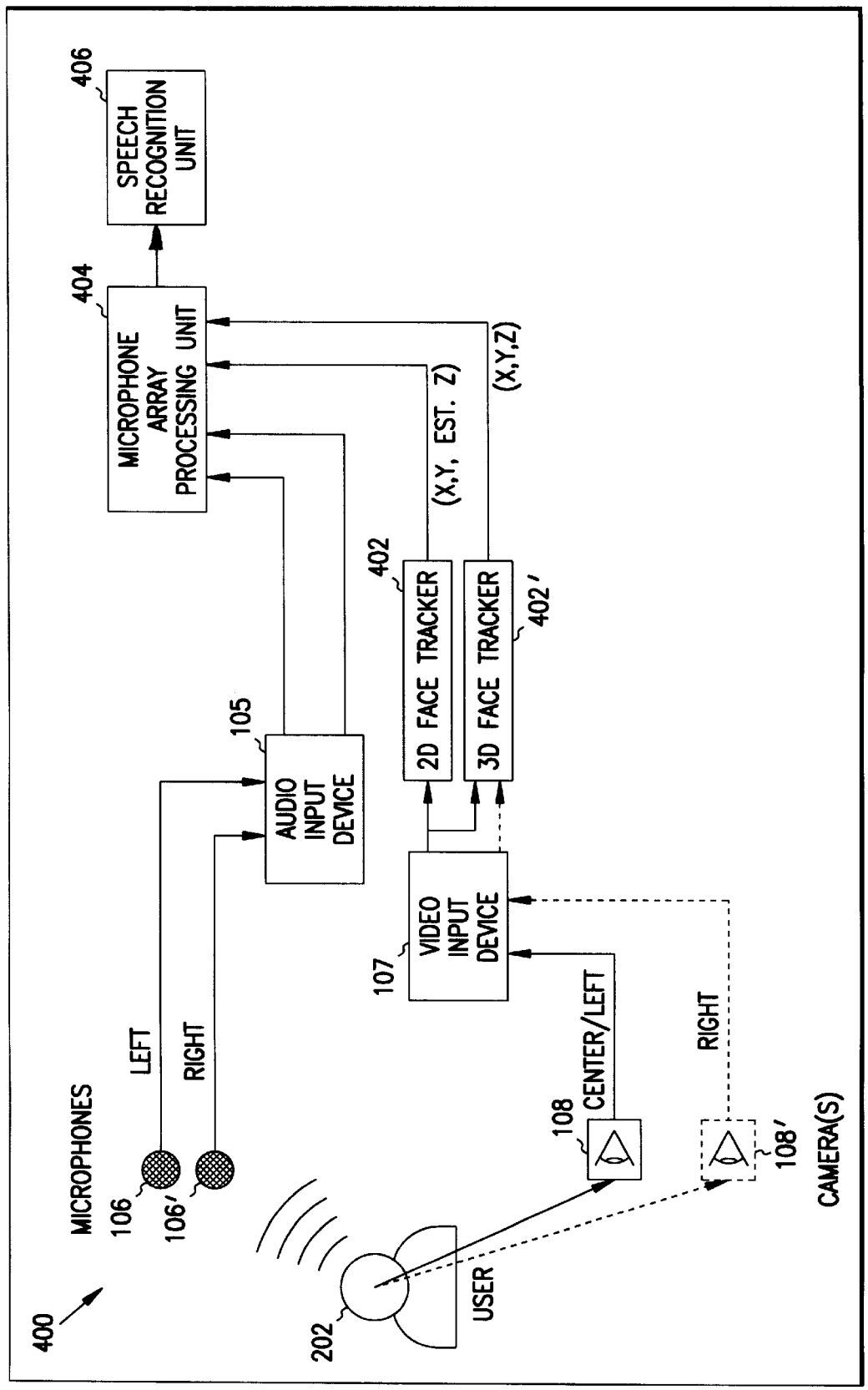
FIGS. 4 and 5 illustrate another example embodiment of the invention in which video input is used to aid in obtaining a filtered audio input for a speech recognition unit.
Figure 5:
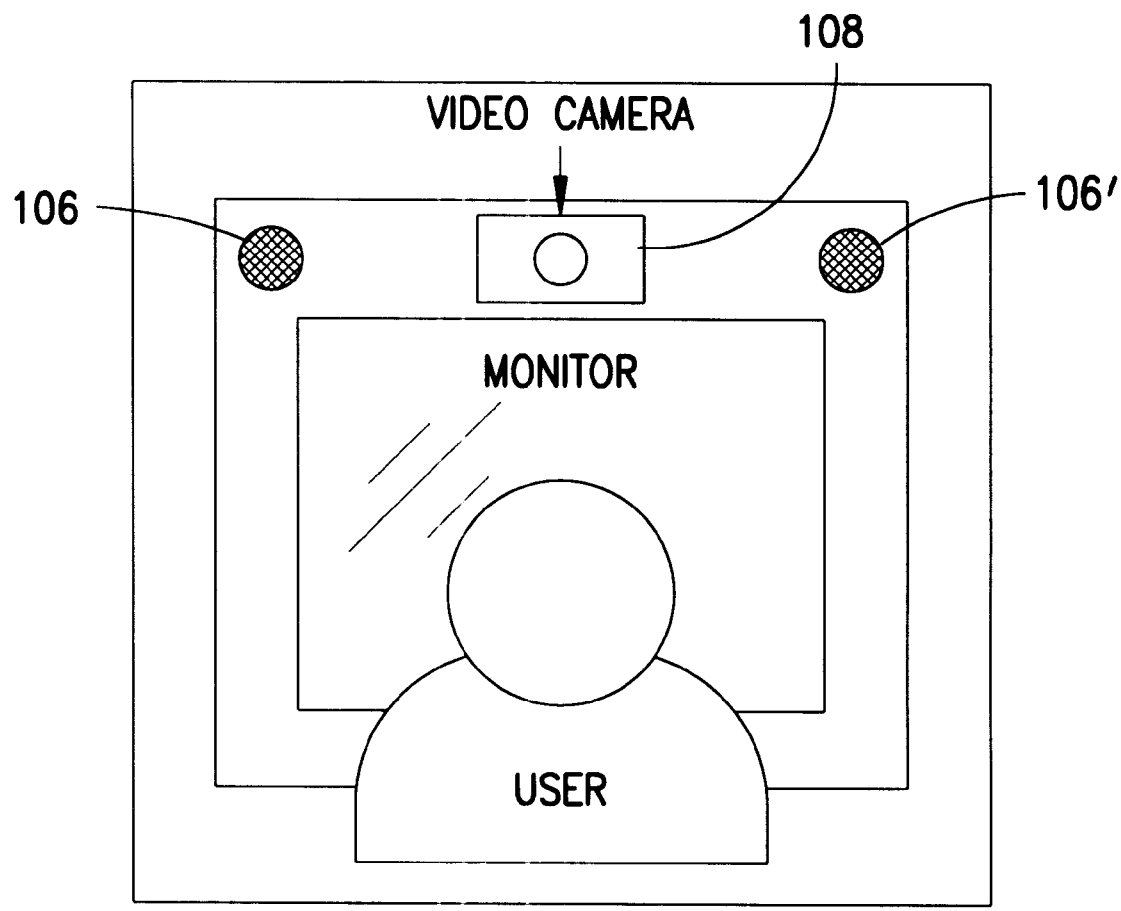

FIGS. 4 and 5 illustrate another embodiment 400 of the invention which provides a video-based face tracker unit 402 used to provide user-positioning information to microphone array processing unit 404. Processing unit 404 in turns provides a filtered audio output signal to a speech recognition unit 406. In operation, the input from the video camera 108 is processed by the two dimensional (2D) face tracker unit 402, which determines and outputs (x, y) position information for the user 202 indicating the user's position in the space within the view of the camera 108. Tracker unit 402 also produces an estimated z position based on the relative size of the head. This data, together with information on the known position of the camera 108 in relation to the microphone array formed by microphones 106 and 106', is fed into the microphone array processing unit 402, which for example uses a point of source filter. Processing unit 402 uses the information on the spatial position of the user to filter the incoming audio stream using microphone array point-of-source filtering, wherein the user's position is selected as the point-of-source to produce a stream of filtered audio carrying the user's voice. Thus, unit 402 can "find" the user's voice even if the user is moving. FIG. 5 illustrates, for one example, the positions that microphones 106 and 106', and video camera 108, may take, when the speech recognition system is deployed on a PC platform. Alternatively, tracker unit 402 may also track other aspects of a user's appearance, such as a reflective or light-emitting device the user may wear that would be easily identified in video processing. As an alternate embodiment, a second camera 108' can be employed to provide stereoscopic vision (see dashed lines in the FIG. 4). This, in turn, can be used by an alternate three dimensional (3D) face tracker unit 402', to provide a more accurate z position.

Figure 6:
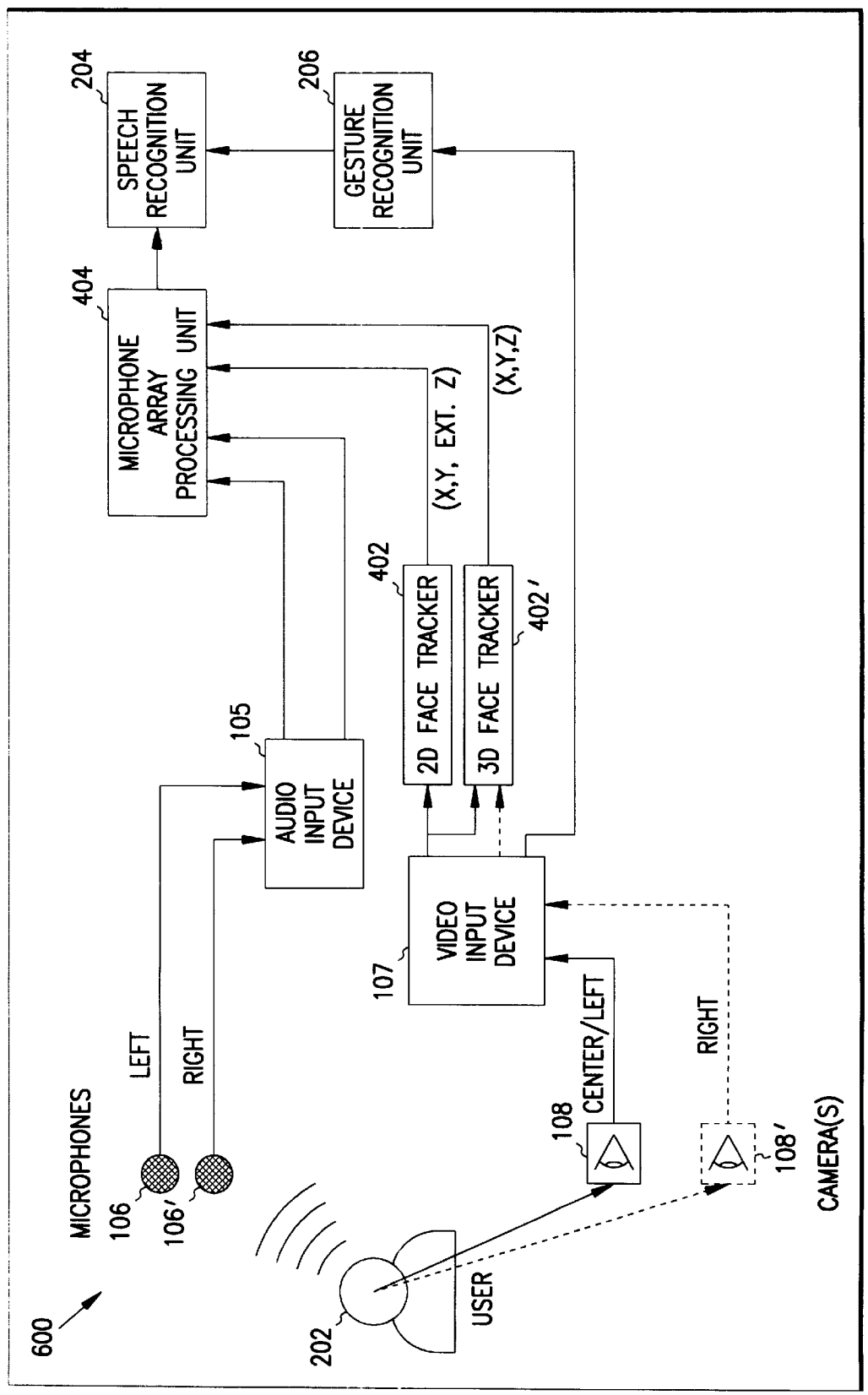
FIG. 6 illustrates yet another example embodiment of the invention combining the embodiments of FIGS. 1–5.

Referring now to FIG. 6, there is illustrated a system 600 which combines all or some of the features of embodiment 200 with embodiment 400. System 600 is of the same design as embodiment 400, but also includes the gesture recognition unit 206 for recognizing gestures to turn the speech recognition capability of speech recognition unit 204 on and off. Thus, system 600 has the capability to isolate the voice and body of a user in a crowded room, and to use gestures to turn speech recognition on and off.

Figure 7:
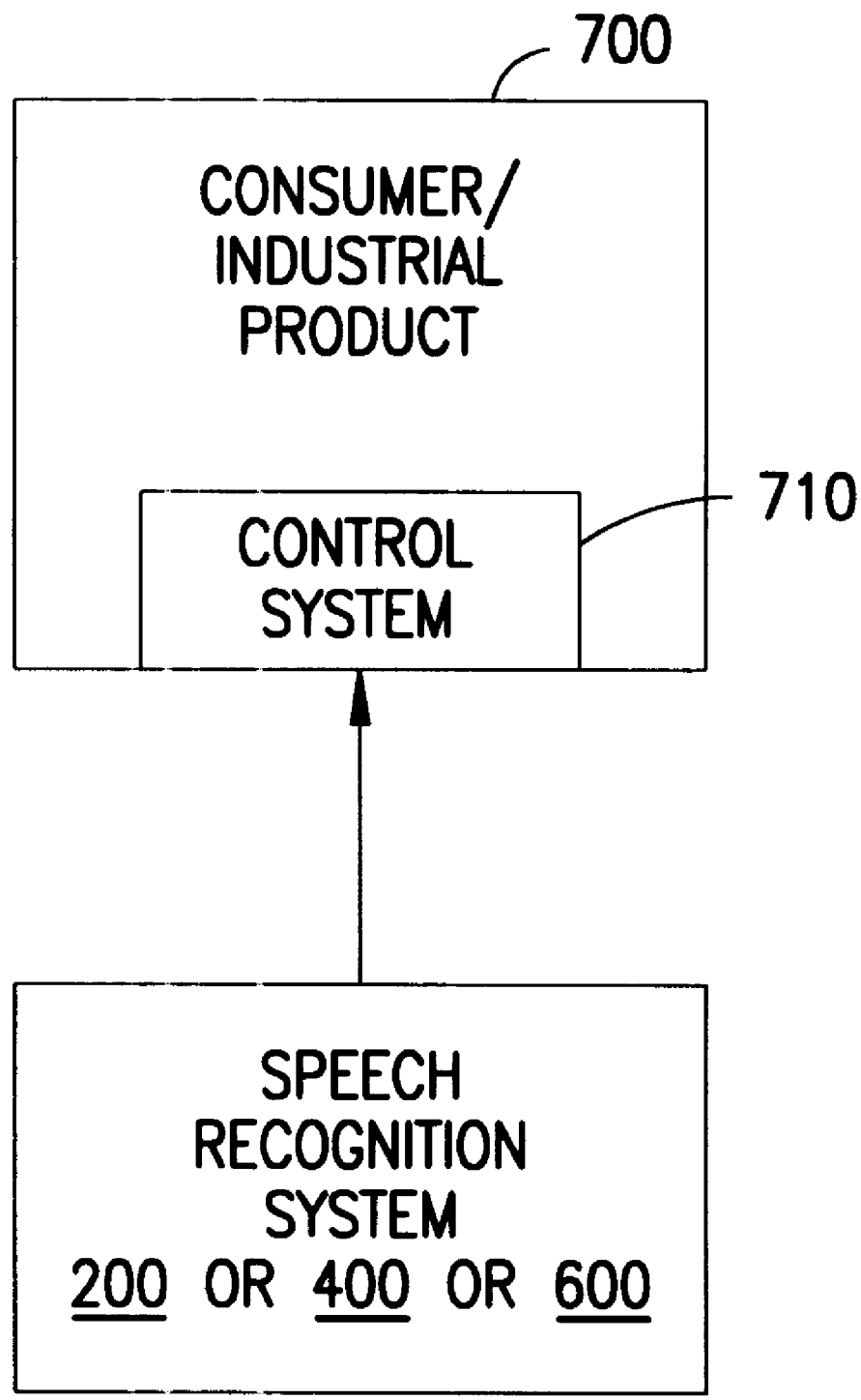
FIG. 7 illustrates yet another example embodiment of the invention adapted for consumer/industrial products.

Referring now to FIG. 7, there is illustrated a consumer or industrial product 700, which has a control system 702 adapted to receive commands output from a speech recognition system embodiment 200, 400, or 600, as described above. Such a consumer or industrial product may be, for example and without limitation, a television, sound system, radio, kitchen appliance, automobile, or lighting system.

Although the invention has been described with respect to specific embodiments, it shall be understood that these embodiments are exemplary only, and that it is contemplated that the described methods and apparatus of the invention can be varied widely while still maintaining the advantages of the invention. Thus, the disclosure should not be taken as limiting in any way the scope of the invention. In addition, as used herein, the term "unit" shall refer to a digital device that may take the form of a hardwired circuit, software executing on a processor, or a combination of both. For example, units 204, 206, 401, 402, 404, and application 208, in one example embodiment and, not by limitation, may take the form of software executing in processor 104, or all or some of the functionality of these components can be provided by hardware only. Furthermore, as used herein, the term machine readable medium shall include, but not be limited to, a storage disk, CD-ROM, RAM or ROM memory, or an electronic signal propagating between components in a system or network.

What is claimed is:

1. A method of controlling the operation of a speech recognition unit, comprising automatically analyzing at least one video image to detect a gesture of a user that signifies a command, and supplying the command to the speech recognition unit to control operation of the speech recognition unit.

2. A method according to claim 1 wherein the command comprises a start or stop command used to start or stop speech recognition.

3. A method according to claim 1 wherein the gesture comprising a motion.

4. A method according to claim 1 wherein the gesture comprises the user looking into the camera.

5. A method according to claim 1 wherein a gesture includes one or more of the group including motions and positions of a user, and wherein both a motion and a position are used to signify a command.

6. A method comprising filtering with a filter an audio input signal and supplying it to a speech recognition unit, wherein the position of a user supplying speech to be recognized is automatically determined by a computer analysis of at least one video image obtained from one or more cameras having a field of view encompassing the user, and position information obtained from the analysis is used by the filter to at least in part isolate the user's voice from other sounds in the user's environment.

7. A method according to claim 6 wherein the audio input signal is obtained from a microphone array.

8. A method according to claim 6 wherein the position is determined using a face tracking algorithm.

9. A method, comprising filtering an audio input signal and supplying it to a speech recognition unit, wherein the position of a user supplying speech to be recognized is automatically determined by a computer analysis of a video image obtained at least in part from at least one camera having a field of view encompassing the user, and position information obtained from the analysis is used by a filter to at least in part isolate the user's voice from other sounds in the user's environment; and controlling the operation of the speech recognition unit, comprising analyzing one or more video images to detect a gesture of a user that signifies a command, and supplying that command to the speech recognition unit.

10. A method according to claim 9 wherein the command comprises a start or stop command used to start or stop speech recognition.

11. A method according to claim 9 wherein the gesture comprises a motion.

12. A method according to claim 9 wherein the gesture comprises the user looking into the camera.

13. A method according to claim 9 wherein a gesture includes one or more of the group including motions and positions of a user, and wherein both a motion and a position are used to signify a command.

14. A method according to claim 9 further comprising obtaining the audio input signal from a microphone array.

15. A method according to claim 9 wherein the position is determined using a face tracking algorithm.

16. Apparatus for controlling the operation of a speech recognition unit response to a gesture by a user, comprising a unit receiving at least one video image of the user, automatically analyzing the video image to detect a gesture of the user that signifies a command, and outputting the command to the speech recognition unit to control operation of the speech unit.

17. Apparatus comprising a filtering unit that receives an audio input signal and position information about a position of a user supplying speech as the source of the audio input signal, wherein the position of the user is automatically determined by analysis of at least one video image of the user, wherein the filter unit further outputs a filtered audio signal based on the position information to a speech recognition unit.

18. Apparatus comprising:

a speech recognition unit;

a unit that receives at least one video image, automatically analyzes the video image to detect a gesture of a user that signifies a command, outputs the command to the speech recognition unit, and outputs position information about the position of the user in the image that signifies that a user has made the gesture that signifies the command; and a filtering unit that receives an audio input signal and the position information about the position of a user supplying speech as the source of the audio input signal, the filter unit further supplies a filtered audio signal to the speech recognition unit, wherein the filtered audio signal produced by the filtering unit depends on the position information.

19. Apparatus according to claim 18 further comprising a video signal analyzing unit that receives a video signal from a camera having a user in its field of view and outputs position information indicating the position of the user to the filtering unit.

20. An article comprising a computer program in a machine readable medium wherein the computer program will execute on a suitable platform to control the operation of a speech recognition unit and is operative to automatically analyze at least one video image to detect a gesture of a user that signifies a command, and supply the command to the speech recognition unit.

21. An article comprising a computer program embodied in a machine readable medium wherein the computer program executes on a suitable platform to analyze at least one video image obtained from one or more cameras having a field of view encompassing a user, and automatically determines information specifying the location of the user in the field of view, and supplies the position information to a filter unit which at least in part isolate the user's voice from other sounds in the user's environment in response to the position information.

* * * * *

UNITED STATES PATENT AND TRADEMARK OFFICE
CERTIFICATE OF CORRECTION

PATENT NO. : 6,243,683 B1 Page 1 of 1
DATED : June 5, 2001
INVENTOR(S) : Peters

It is certified that error appears in the above-identified patent and that said Letters Patent is hereby corrected as shown below:

Column 5, claim 1,
Line 11, delete "to detect" and insert -- to independently detect --, therefor.

Column 5, claim 3,
Line 19, delete "comprising" and insert -- comprises --, therefor.

Column 5, claim 6,
Line 32, delete "information obtained" and insert -- information independently obtained --, therefor.

Column 5, claim 9,
Line 46, delete "information obtained" and insert -- information independently obtained --, therefor.

Column 6, claim 16,
Line 8, delete "to detect" and insert -- to independently detect --, therefor.

Column 6, claim 17,
Line 18, after "user" insert -- to independently detect the postion of the user --.

Column 6, claim 18,
Line 25, delete "to detect" and insert -- to independently detect --, therefor.

Column 6, claim 20,
Line 48, delete "to detect" and insert -- to independently detect --, therefor.

Column 6, claim 21,
Line 58, delete "view, and" and insert -- view, wherein the location of the user is independently determined, and --, therefor.

Signed and Sealed this

Second Day of April, 2002

*Attest:*

*Attesting Officer*

JAMES E. ROGAN
*Director of the United States Patent and Trademark Office*